(12) United States Patent
DeLaune

(10) Patent No.: US 7,422,178 B2
(45) Date of Patent: Sep. 9, 2008

(54) NON-THREADED STRUCTURAL INSERT FOR COMPONENT ATTACHMENT

(75) Inventor: Michael J. DeLaune, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 324 days.

(21) Appl. No.: 10/970,433

(22) Filed: Oct. 21, 2004

(65) Prior Publication Data

US 2006/0097110 A1     May 11, 2006

(51) Int. Cl.
     *B64C 1/12*     (2006.01)
(52) U.S. Cl. ................ 244/132; 244/131; 244/129.1
(58) Field of Classification Search ............. 244/132, 244/131, 129.1, 137.4; 411/338, 82, 82.1
See application file for complete search history.

(56) References Cited

U.S. PATENT DOCUMENTS

| | | | | |
|---|---|---|---|---|
| 1,374,615 A | * | 4/1921 | Talty | .......................... 411/338 |
| 4,898,756 A | * | 2/1990 | Oefner | ....................... 428/34.1 |
| 5,314,144 A | * | 5/1994 | Porter et al. | ................. 244/132 |
| 6,394,722 B1 | * | 5/2002 | Kunt et al. | ..................... 411/82 |

\* cited by examiner

*Primary Examiner*—Timothy D Collins
(74) *Attorney, Agent, or Firm*—Bracewell & Giuliani LLP

(57) ABSTRACT

The present invention provides a non-threaded insert operable to transfer or couple a mechanical load to a structure. This non-threaded insert includes an upper insert having a noncircular cross section and a lower insert. The coupled upper and lower insert are received within the structure and are operable to receive a mechanical load which is then distributed to the structure. The noncircular cross section of the upper insert is received within a noncircular receptacle wherein rotation of the upper insert within the receptacle is inhibited by mating the noncircular cross section of the upper insert within the noncircular receptacle. This allows mechanical loads to be distributed to be better coupled to materials such as composite materials wherein traditional thread fasteners would intensify mechanical stresses within the coupled threads.

24 Claims, 7 Drawing Sheets

NON-THREADED STRUCTURAL INSERT FOR COMPONENT ATTACHMENT

GOVERNMENT INTEREST

This invention was made with Government support under Contract Number N00019-02-C-3002 awarded by The Department of the Navy. The Government has certain rights in this invention.

TECHNICAL FIELD OF THE INVENTION

The present invention relates generally to fasteners and more particularly, a non-threaded structural insert operable to couple a mechanical load to a composite material structure.

BACKGROUND OF THE INVENTION

In recent years, the use of advanced composite structures has experienced tremendous growth in the aerospace, automotive, and many other commercial industries. While composite materials offer significant improvements in performance, they require strict control procedures in the manufacturing processes. The use of composite materials in military fighter aircraft has increased. For instance, in the F14, 0.8% of the total structural weight of the aircraft was made from composite. In the F15, F16 and F18, 1.6%, 2.5% and 9.5%, respectively, was composite. In the Joint Strike Fighter (JSF), composite materials comprise more than 50% of the aircraft structural weight. Similarly, large transport aircraft use of composites has increased as well. In 1985, 3% of the aircraft's structural weight was composite and this percentage has only increased.

Composite structures are typically held together by adhesives, but this has not always been found practical. In conventional aluminum aircraft, approximately 25 fasteners per square foot of external surface area are used. In one estimate, composite aircraft use approximately 12 fasteners per square foot of outside surface area.

Traditional fasteners require internal threads within the substructure. The use of threaded fasteners within composite material structures requires material changes to accept the fastener. Otherwise, component life of the composite is significantly reduced at the thread roots of the threaded fastener coupled to non-reinforced composite material. These internal threads require that the weight be increased due to material changes of the internal structure to a stronger material as well as increasing the size of the structure to limit crack initiation at the threaded roots of the mechanical fastener. Additionally, when composite materials are used, this results in a limited repair capability and reduced component life.

Traditional pylon attachment design have included a threaded structural insert serving as a repairable wear surface installed in the substructure and secured with securing adhesives. External load attachment creates areas of high structural stress and loading. For example, in an aircraft, pylon attachments experience high structural loading and stress, and may be located within areas of an aircraft that already experience high structural loading such as a wing-fold rib. The wingfold rib experiences high loading during flight, take-off and landing.

Specially-shaped and modified metal fasteners have been used in composite structures previously. These fasteners result in increased weight by replacing portions of the composite structure. Additionally, the composite structure must be modified to accept these modified fasteners. These fasteners may be unnecessarily strong, heavy, expensive and undesirably reflective to radar detection devices. Thus, a need exists for improved fasteners for use with composite structures having the necessary strength characteristics.

SUMMARY OF THE INVENTION

The present invention provides a non-threaded structural insert that substantially addresses the above identified needs as well as others. More specifically, the present invention provides a non-threaded insert operable to transfer or couple a mechanical load to a structure, such as a composite structure. This non-threaded insert includes an upper insert having a noncircular cross section and a lower insert. The upper and lower insert mechanically couple via internal threads or other like means. The coupled insert may also receive within the structure a mechanical load which is then distributed to the structure. The noncircular upper insert is received within a noncircular receptacle wherein rotation of the upper insert within the receptacle is inhibited by mating the noncircular cross section of the upper insert to the noncircular receptacle. This fastener allows mechanical loads to be distributed to materials, such as composite materials, wherein traditional threaded fasteners would intensify mechanical stresses within the composite material.

A second embodiment provides a non-threaded insert operable to receive a mechanical load and couple the load to the structure. This non-threaded insert includes an upper and lower insert. The coupled non-threaded insert has a noncircular cross section that the structure receives within a noncircular receptacle to inhibit rotation of the non-threaded insert with respect to the structure. The contours of the upper surface of the upper insert and the lower surface of the lower insert conform to the contour of the upper surface or lower surface of the structure. This prevents discontinuities which would inhibit fluid flow over the structure such as an aircraft wing. Furthermore, aircraft pylons may couple to the structure, and receive mechanical loads and otherwise allow mechanical loads to be received by and distributed to the structure, without intensifying the localized stress often associated with threaded fasteners.

Yet another embodiment of a present invention provides a method of coupling the mechanical load to a structure such as an aircraft wing. This method involves mating an upper insert having a noncircular cross section to a noncircular receptacle located within the structure. Rotation of the upper insert within the noncircular receptacle is prevented by the mating of the upper insert to the noncircular receptacle. A lower insert mechanically couples to the upper insert. The coupled upper insert and lower insert are operable to couple to a mechanical load and mechanically couple and distribute that load to the structure while reducing localized stresses. The contour of the upper insert may match the contour of the upper surface of the structure in order to avoid discontinuities which would be experienced by fluid flow over the structure. The mechanical load may be mechanically coupled to the coupled upper and lower insert using a traditional mechanical fastener, such as a threaded fastener or other fastening system known to those skilled in the art.

The profile of the coupled upper and lower insert allow mechanical loads to be received and distributed across a structure without the structure experiencing the intense localized mechanical stresses often associated with threaded fasteners. This is particularly valuable when the structure is made from a material such as composite materials wherein localized regions of the composite material would experience significant stresses associated with the receiving of a threaded fastener. These stresses may significantly degrade the physical properties of the composite material.

The present invention provides significant advantages over the prior art, in that the present invention provides the ability to transfer loads from the attachment bolt to the structure without the need for internal threads within the structure as cracks in the structure often initiate from the thread roots. Additionally, the upper and/or lower inserts may be machined to be flush with the structure. Further, the upper and/or lower inserts may have a noncircular (i.e. non-symmetrical) cross section to prevent rotation of the non-threaded insert within the structure. Other features and advantages of the present invention will become apparent from the following detailed description of the invention made with reference to the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the figures, like numerals being used to refer to like and corresponding parts of the various drawings.

The present invention provides an integrated fastener assembly having the ability to transfer mechanical loads from an attachment bolt to a composite structure without the need for internal threads within the composite material structure. In one embodiment, the integrated fastener may have machined outer surfaces designed to be flush with the structure and a noncircular profile (i.e., non-symmetrical) that prevents rotation of the non-threaded fastener within the structure.

One particular embodiment calls for the attachment of structural loads in areas of high structural loading or stress. For example, a pylon within an aircraft may be located at a wing fold rib and experiences high loading and stresses during flight, takeoff, and landing. Traditional attachments have required internal threads in the sub-structure. These internal threads cause weight increase due to material changes to stronger materials, weight increase due to sizing to prevent crack initiation at the thread roots, limited repair capabilities, and reduced component life. The present invention addresses this problem with the non threaded insert.

Figure 1:
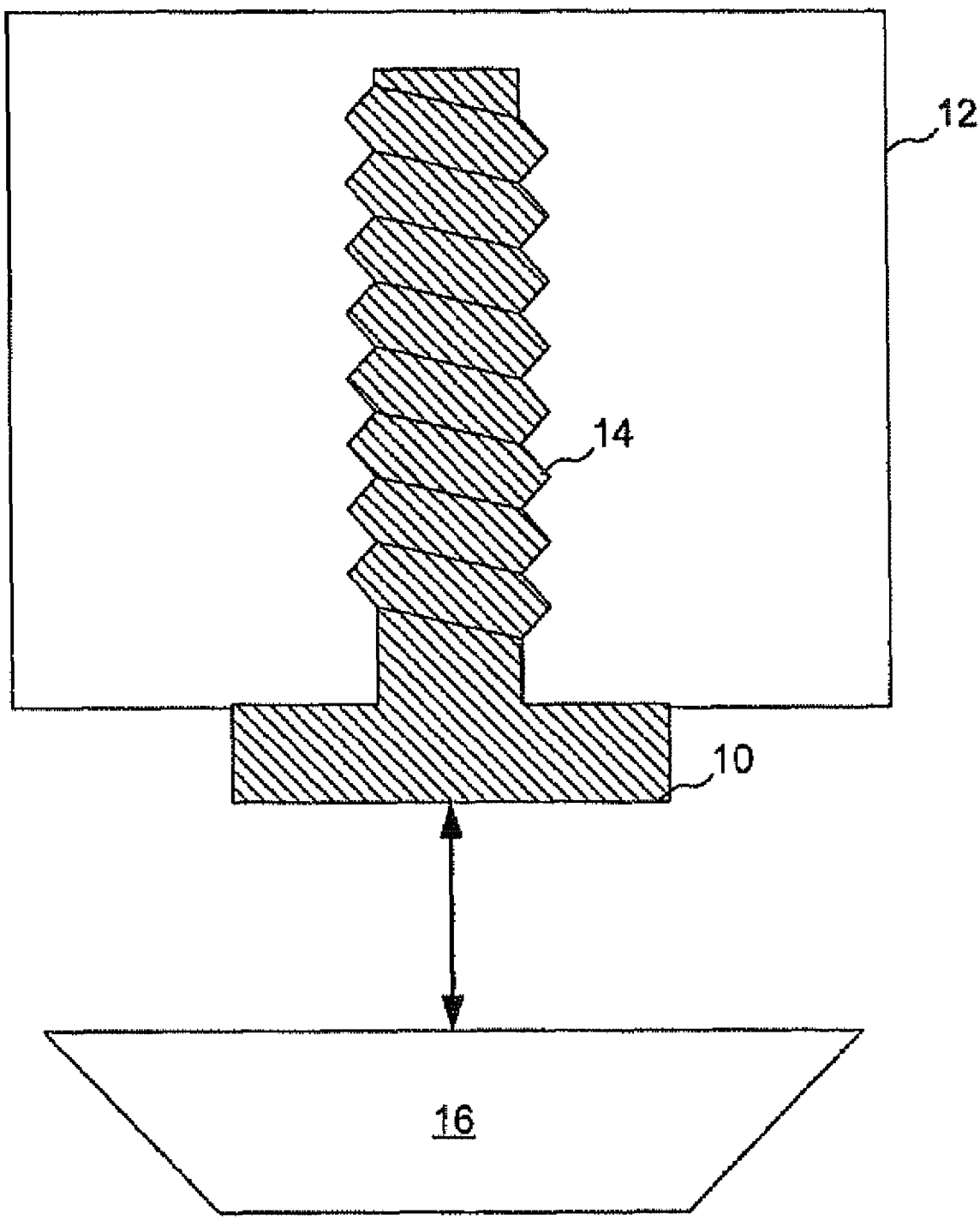
FIG. 1 shows a prior art threaded fastener used to attach a load to a structure.

FIG. 1 shows a typical threaded fastener, such as a bolt, wherein fastener 10 is threaded into structure 12. Thread roots 14 of fastener 10 necessitate a change in the material composition of structure 12 when the structure is made from composite materials. This change in material composition allows increased strength characteristics so that bolt or fastener 10 may receive load 16. This results in an undesirable increase in the weight of the overall structure, such as an aircraft containing structure 12, as well as the increased potential for crack initiation within the composite material of structure 12 at thread roots 14. Both outcomes result in decreased performance where the structure is located within an aircraft. The presence of cracks within a composite material would reduce the ability to easily repair the composite material structure such as those found within an advanced tactical aircraft. Additionally, the overall lifetime of the composite material of structure 12 may be significantly reduced.

Figure 2:
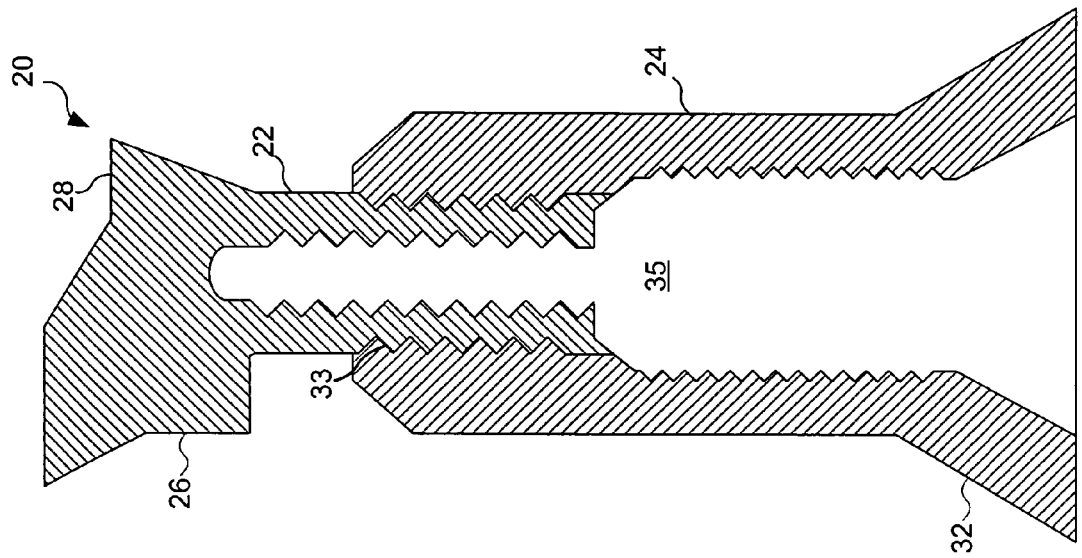
FIG. 2 shows a cross section of a non-threaded insert in accordance with one embodiment of the present invention.

FIG. 2 provides a cross section of a non-threaded structural insert that may be used for component attachment as provided by the present invention. Structural insert 20 includes an upper insert 22 and lower insert 24. As shown, upper insert 22 has head 26 that may be countersunk within composite material structure 30. Structure 30 may also comprise any material that is subjected to increased fatigue failure by increased localized stresses. Such materials include metals that are subject to increased failures from localized stresses. These localized increased stresses may be experienced in regions that focus the stresses within materials such as thread roots or other like structures. Upper surface 28 of head 26 may have a profile that matches the profile of a receptacle within composite material structure 30 which will be depicted further in FIGS. 4, 5 and 6. Both upper head 26 of upper insert 22, and lower head 32 of lower insert 24, may be countersunk within composite material structure 30. Upper insert 22 may mate with lower insert 24 using threads or other traditional fastening methods. However, the combined profile, which may taper at both the top and bottom of the non-threaded insert, allows the load carried by non-structural insert 20 to be mechanically couple or distributed to composite material structure 30. Non-threaded insert 20 eliminates the need for threads within the composite material that would result in increased localized stresses at thread roots. Additionally, the need for material or size changes at the load bearing site is eliminated or reduced. These changes favorable affect the component life of composite material structure 30. Lower insert 24 may contain a countersunk receptacle 35 to mate with an attachment bolt or other like device.

Figure 3:
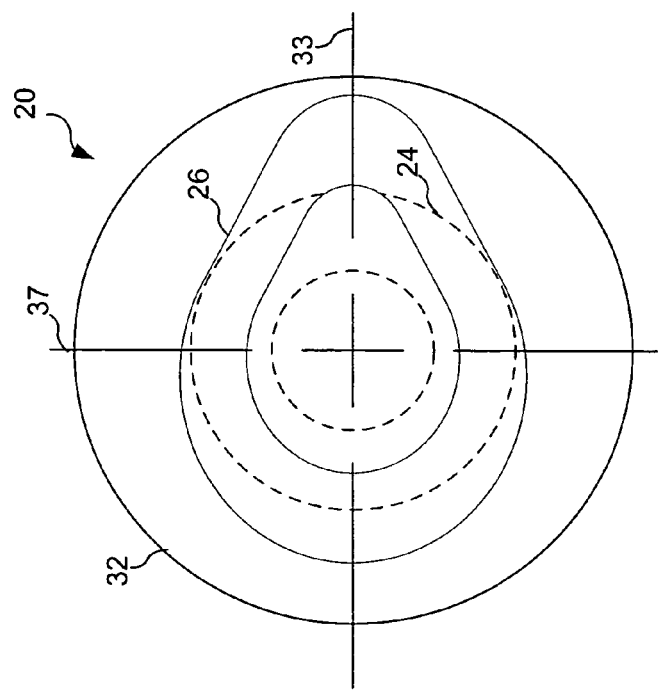
FIG. 3 shows a top down view of a non-threaded insert in accordance with the present invention.

FIG. 3 provides a top view of non-threaded insert 20 depicting the noncircular nature of head 26 of upper insert 22. This noncircular head is received by a matching noncircular receptacle in composite material structure 30. Additionally FIG. 3 also shows that lower head 32 of lower insert 34 is circular and shares common axes 37 with upper insert 22. The noncircular nature of upper head 26, relative to axes 37, prevents rotation of non-threaded insert 20 within a noncircular receptacle.

Figure 4:
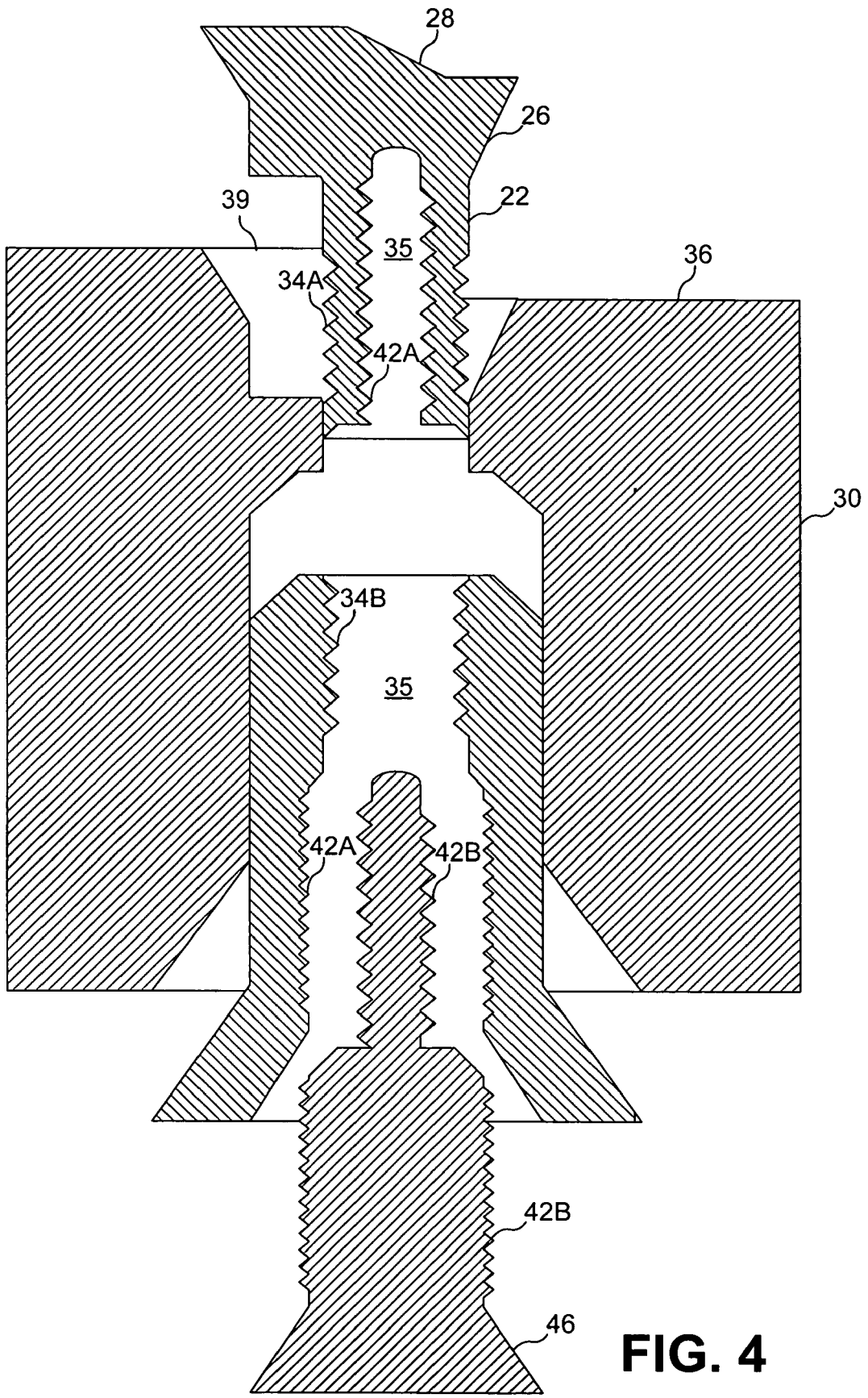
FIG. 4 shows an exploded view of a non-threaded insert and a receptacle to receive the non-threaded insert noncircular in accordance with the present invention.

FIG. 4 is an exploded view of non-threaded insert 20 to be received within noncircular receptacle 39 of composite material structure 30. As shown, upper insert 22 slides into noncircular receptacle 39 within composite material structure 30.

Noncircular head 26 prevents rotation of upper insert 22 within noncircular receptacle 39. Threads 34A of upper insert 22 are operable to mechanically couple with threads 34B of lower insert 24. One should note that noncircular receptacle 39 is countersunk on the upper and lower surface of composite material structure 30. Countersinking eliminates discontinuities by matching contour 28 of upper insert 22 with that of upper surface 36 of composite material structure 30. Similarly, the countersunk lower head 32 of lower insert 24 may seamlessly match the lower surface of composite material structure 30. This is clearly shown in FIG. 5. Where upper insert 22 has engaged lower insert 24, and because of the outer profile of non-threaded insert 20, mechanical loads are able to be transferred from non-threaded insert 20 to composite material structure 30. Additionally, as illustrated in FIGS. 4 and 5, mechanical threads 42A on either or both the inner surface of lower insert 24 or upper insert 22 within receptacle 35 are operable to receive and engage threads 42B of attachment bolt 46.

Figure 5:
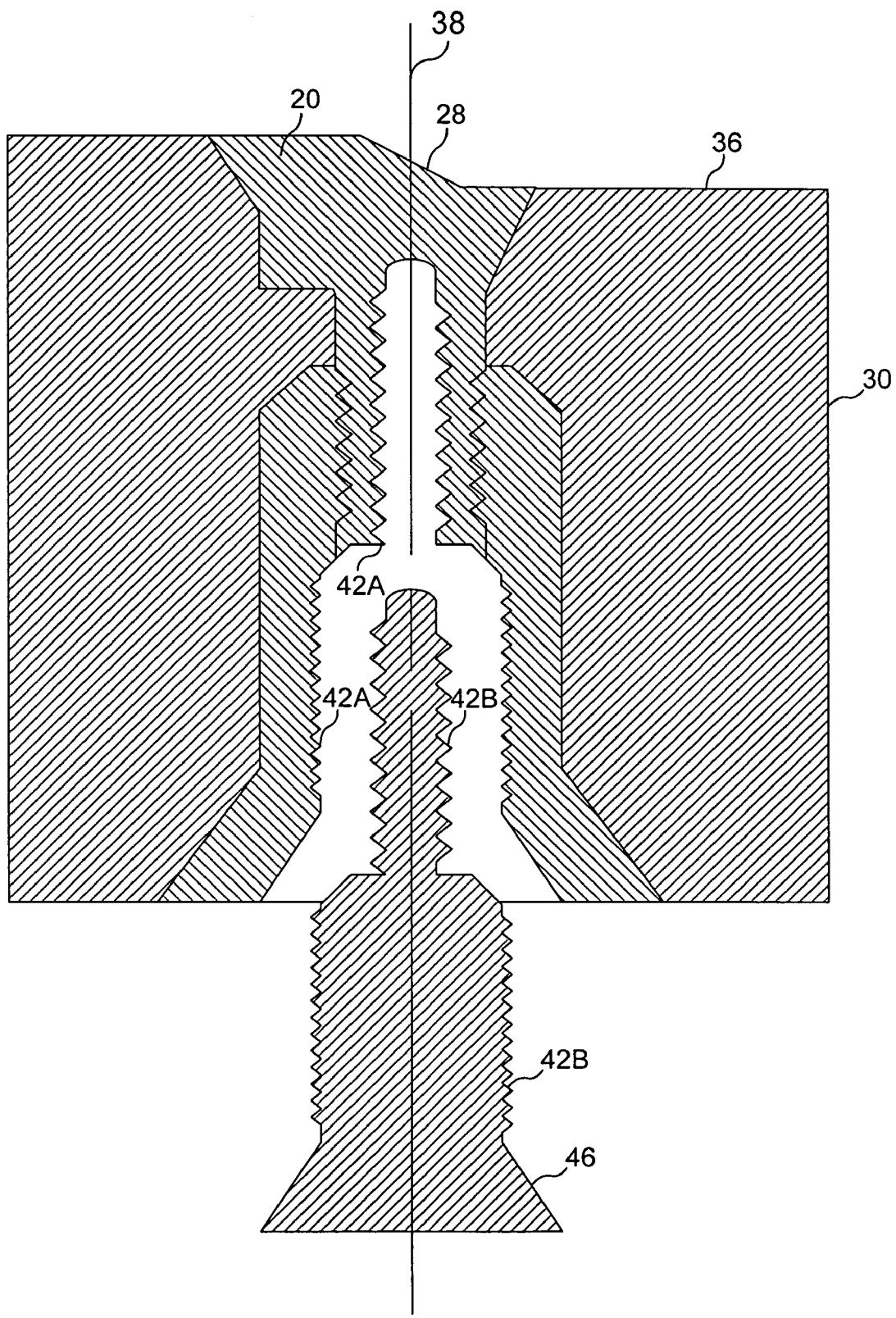
FIG. 5 provides a cross sectional view of the non-threaded insert in place within a non-threaded, noncircular receptacle of a structure and a load bolt or other mechanical fastener with which a load will be received in accordance with one embodiment of the present invention.

FIG. 5 depicts non-threaded structural insert 20 installed within composite material structure 30. The profile of contour 28 aligns with upper surface 36. Further, head 26 of structural insert 20 is countersunk within composite material structure 30. By machining the surface of upper insert 22 to provide contour 28 that conforms to upper surface 36 of composite material structure 30, observable properties or signatures of an aircraft using these non-threaded inserts may be reduced. Further, surface discontinuities of composite material structure 30 are minimized for increased aircraft performance. One can also note that head 26 of upper insert 22 is not symmetrical about axis 38. Thus, the non-symmetrical properties of upper insert 22 prevent the rotation of upper insert 22 within noncircular receptacle 39 of composite material structure 30. Mechanical threads or other like mechanical fasteners may be employed to fasten or couple upper insert 22 to lower insert 24. Additionally, mechanical threads 42A and 42B within a countersunk recess of either upper insert 22 and/or lower insert 24 may mechanically couple to load attachment bolt 46.

Figure 6:
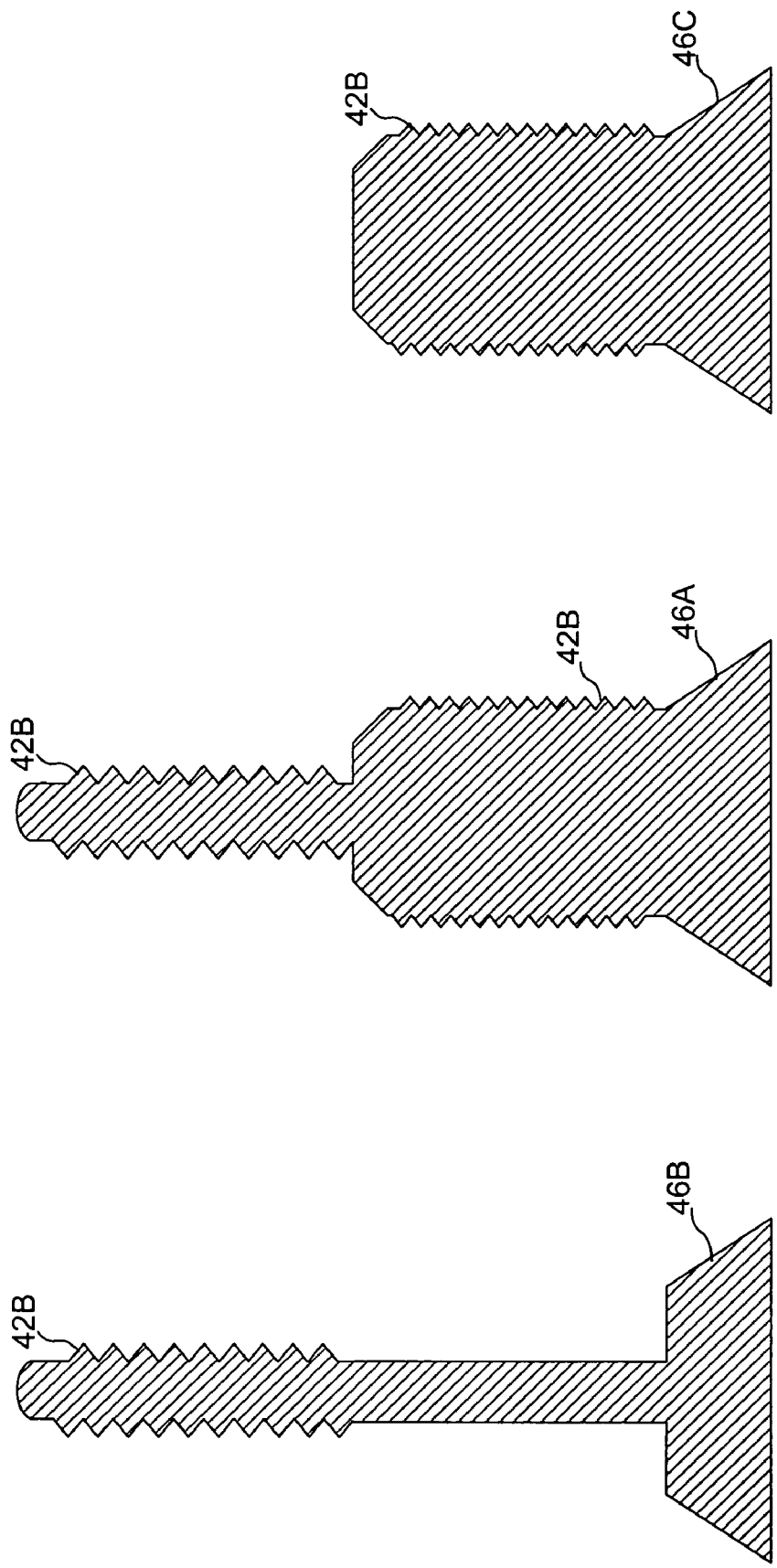
FIG. 6 provides a cross sectional view of the load bolt, receptacle covers or other mechanical fasteners with which a load will be transmitted in accordance with the present invention.

FIG. 6 provides a cross sectional view of load bolts, receptacle covers or other mechanical fasteners with which a load will be transmitted. Load attachment bolt or receptacle cover 46A is depicted as having mechanical threads 42B which may engage both the upper insert and lower insert. Load attachment bolt or receptacle cover 46B has mechanical threads 42B which engage only the upper insert. Load attachment bolt or receptacle cover 46C has mechanical threads 42B which may engage only the lower insert.

Figure 7:
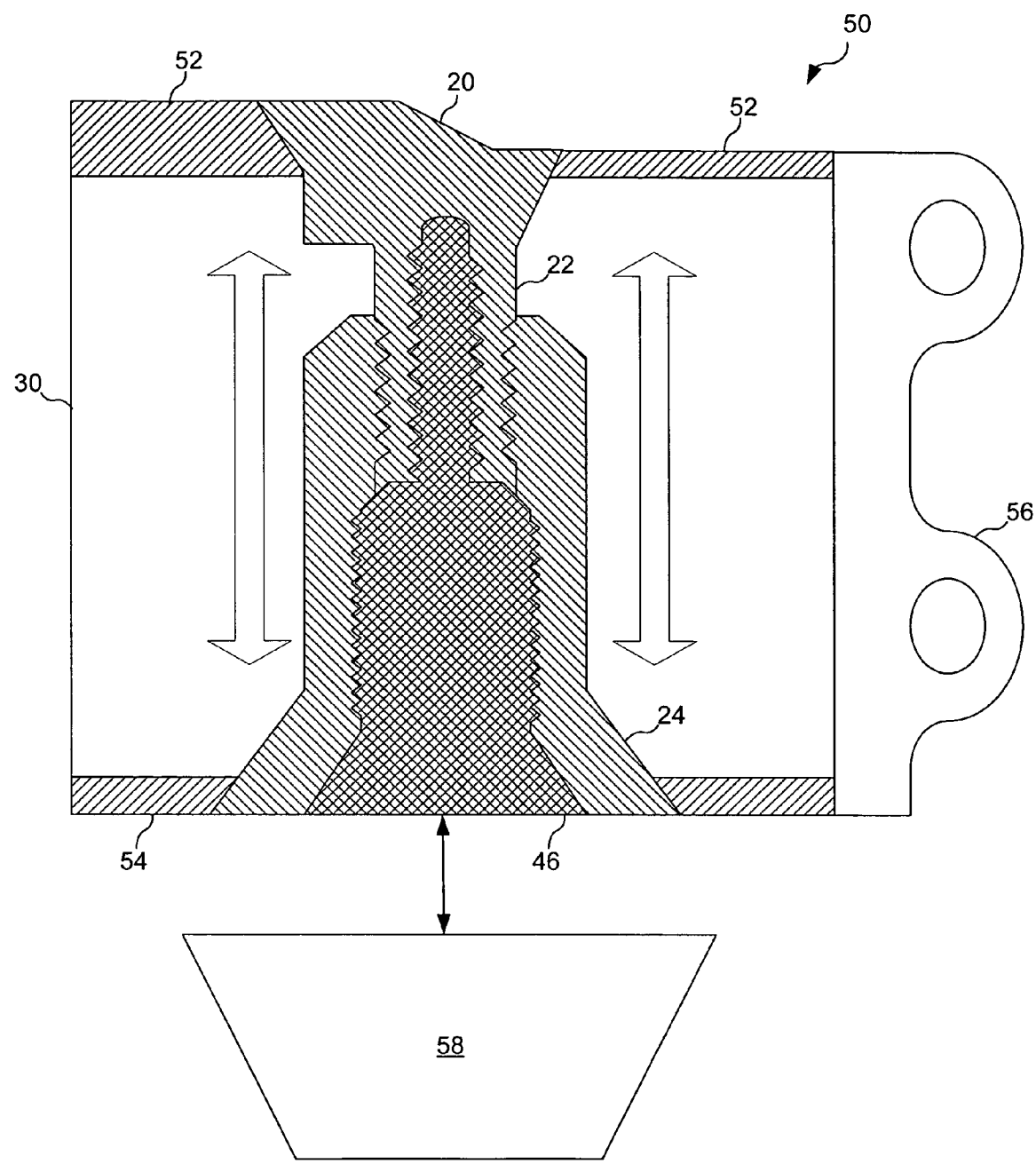
FIG. 7 provides a cross sectional view of a composite material structure, such as an aircraft wing, utilizing a non-threaded insert in accordance with the present invention.

FIG. 7 depicts an embodiment where a composite structure, such as a wing, utilizes a non-threaded insert operable to attach a load or transfer a structural load to the wing. Previously, this required a reinforced rib to receive pylon bolts which resulted in increased weight and decreased component life. Here, a cross-sectional view of non-threaded structural insert 20 within composite material structure 30, such as wing 50, is shown. Upper insert 22 and lower insert 24 mechanically couple via threads 34A and 34B and, in fact, may serve to bind or compress upper surface 52 and lower surface 54 to an internal composite material structure 30. The profile of non-threaded insert 20 applies compression forces from non-threaded structural insert 20 onto composite material structure 30. As shown here, the non-structural insert is located near wing-fold rib 56. The countersunk non-threaded insert receives vertical loads via pylon 58 and transfers these to wing 50. Additionally, the profile of non-threaded insert 20, in fact, may clamp upper surface 52 and lower surface 54 to composite material structure 30. This eliminates a threaded wing-fold rib which may decrease the performance of an aircraft by increasing its weight and the complexity of the structure. Although the specific embodiment shown provides a non-threaded insert within a wing that comprises composite materials, the non-threaded insert may be applied to any structure wherein mechanical threads cause the need for material changes, or other like changes as those required for composite material structure.

Figure 8:
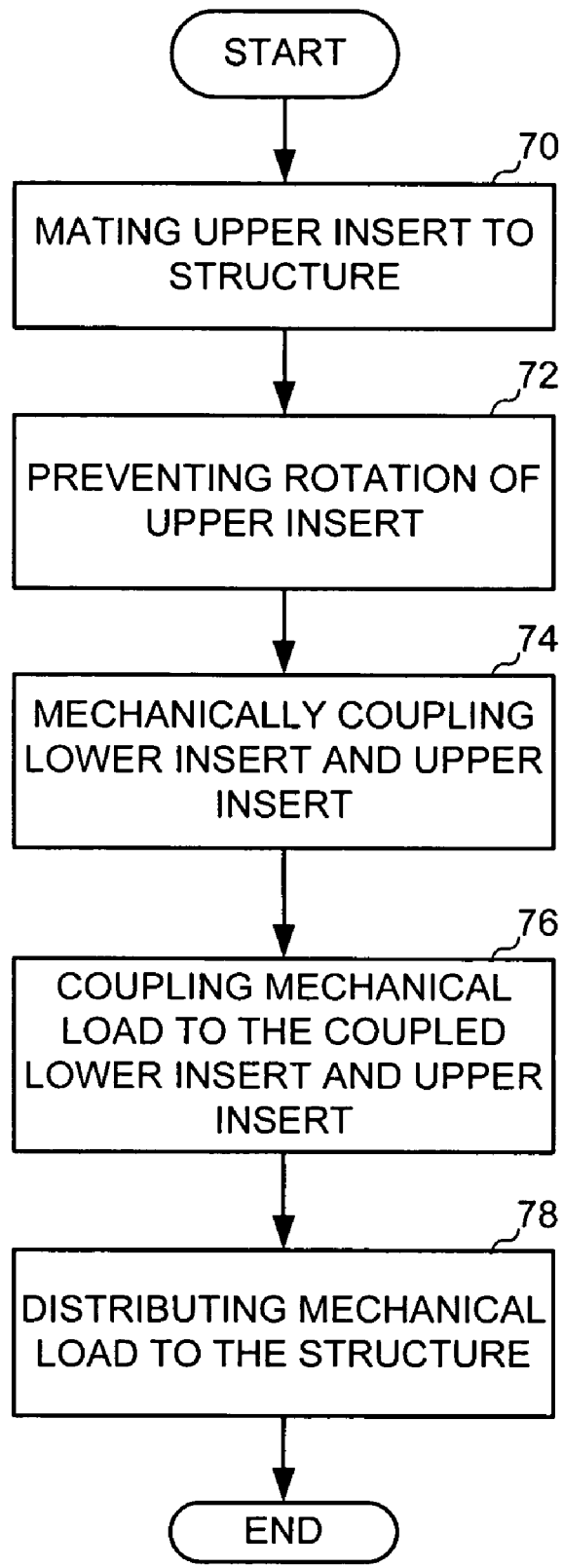
FIG. 8 provides a logic flow diagram describing the process associated with mechanically coupling a mechanical load to a composite structure in accordance with one embodiment of the present invention.

FIG. 8 provides a logic flow diagram illustrating the processes associated with mechanically coupling a load to a composite structure. Here, a non-threaded insert made up of an upper insert is mated with a noncircular receptacle in step 70. The noncircular receptacle prevents the rotation of the upper insert in step 72. A lower insert may be mechanically coupled to the upper insert in step 74. Together, the upper and lower insert may be used to mechanically clamp outer layers, such as upper outer layer 52 and lower outer layer 54 of wing 50 as depicted in FIG. 7, or otherwise clamp or apply compressive forces to the structure receiving the non-threaded insert. Additionally, a mechanical load may be coupled to either the lower or upper insert via a mechanical fastener receptacle within either or both inserts step 76. This allows an external mechanical load to be distributed to the structure in step 78.

In summary, the present invention provides a non-threaded insert component with a countersunk upper or lower feature for part location and load transfer, along with internal threads that mechanically couple and secure an external load to a composite structure. The upper and lower surface of the non-threaded insert may have a contour that conforms to the surfaces of a composite material structure or other like structure which receives the non-threaded insert. This minimizes discontinuities in the surface for fluid flow purposes, as well as minimizing discontinuities for observability purposes or other known reasons. An attachment bolt or cover bolt may be mechanically coupled to the non-threaded insert depending on whether or not an external load is to be coupled via the non-threaded insert. The non-threaded insert, when applied to a vehicle such as an aircraft, may result in an overall reduced weight due to reduced fastener count and the ability to use maximum load carrying fasteners in a highly loaded area, such as the wing-fold of an aircraft. The internal receptacle of the non-threaded insert as well as the receptacle receiving the non-threaded insert provides adequate bearing surfaces for the external load. The residual benefit of this design is the creation of a compressive stress region between the upper and lower insert that minimizes cracking or loaded effects which can cause fracture within critical components.

The present invention provides a significant technical advantage in that the elimination of internal threads within a composite material reduces the potential for fracture within critical components, further reduces component sizing and weight requirements for load bearing purposes, and improves component life. This solution also reduces fatigue due to the compressive stress region created by the upper and lower countersunk features.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A non-threaded insert operable to transfer a mechanical load to a structure, comprising:
    an upper insert having an axis and an upper head with a noncircular cross sectional shape transverse to the axis, wherein the structure has an upper countersink that is complementary in shape to and receives the upper head of the upper insert to prevent rotation of the upper insert relative to the structure;
    a lower insert coaxial with the upper insert and having a lower head, wherein the structure has a lower countersink that is complementary in shape to and receives the lower head of the upper insert, and wherein the lower insert couples to the upper insert, such that the coupled upper insert and lower insert are operable to receive a mechanical load and distribute the load to the structure; and
    a mechanical fastener extending through the lower insert, threadingly engaged to at least the upper insert, and operable to couple to the mechanical load.

2. The non-threaded insert of claim 1, wherein the structure comprises composite materials, and wherein the upper and lower heads are flush with the structure relative to the axis.

3. The non-threaded insert of claim 1, wherein the mechanical fastener is a load attachment bolt having two different sets of mechanical threads that separately couple to the lower insert and to the upper insert.

4. The non-threaded insert of claim 1, wherein mechanical threads couple the upper insert to the lower insert.

5. The non-threaded insert of claim 1, wherein mechanical threads couple the mechanical fastener to the mechanical load.

6. The non-threaded insert of claim 1 wherein the structure comprises an aircraft wing.

7. The non-threaded insert of claim 6, wherein the mechanical load comprises an aircraft pylon operable to receive a payload.

8. An assembly, comprising:
    a structure having a hole with an axis, a first countersink at one end of the hole, and a second countersink at an opposite end of the hole, the first countersink having a noncircular cross-section transverse to the axis;
    first insert having a first head with a noncircular cross-section transverse to the axis that is complementary in shape to and located in the noncircular cross-section of the first countersink of the structure to prevent rotation of the first insert with respect to the structure;
    a second insert coaxial with the first insert, the second insert having a second head that is located in and complementary in shape to the second countersink, the second insert being coupled to the first insert, wherein the coupled first and second inserts are operable to receive a mechanical load and distribute the load to the structure.

9. The assembly of claim 8, wherein the first and second heads are flush with outer surfaces of the structure relative to the axis.

10. The assembly of claim 9, wherein the structure comprises composite materials.

11. The assembly of claim 10, wherein the structure comprises an aircraft wing.

12. The assembly of claim 11, wherein the mechanical load comprises an aircraft pylon operable to receive a payload.

13. The assembly of claim 10, further comprising a mechanical fastener extending through the second insert, threadingly engaged to the first insert, and operable to couple to the mechanical load.

14. The assembly of claim 13, wherein mechanical threads couple the mechanical fastener to the second insert.

15. The assembly of claim 13, wherein the mechanical fastener is a load attachment bolt having two different sets of threads that separately couple to the first and second inserts.

16. The assembly of claim 13, wherein mechanical threads couple the mechanical fastener to the mechanical load.

17. A method of coupling a mechanical load to a structure, comprising:
    mating an upper insert having an axis a noncircular cross-section transverse to the axis into a complementary noncircular receptacle located within the structure;
    preventing rotation of the upper insert within the complementary noncircular receptacle with the mating of the upper insert to the noncircular receptacle;
    mechanically coupling a lower insert to the upper insert;
    securing a load attachment bolt through the lower insert to engage the upper insert; and
    coupling the upper insert, the lower insert and the load attachment bolt to a mechanical load to distribute the load to the structure.

18. The method of claim 17, wherein mechanical threads couple the mechanical fastener to the coupled upper insert and lower insert.

19. The method of claim 17, wherein mechanical threads couple the upper insert to the lower insert.

20. The method of claim 17, wherein:
    the lower insert is complementary in shape to a lower surface of the structure, and the upper and lower inserts are flush with outer surfaces of the structure.

21. The method of claim 20, wherein the structure comprises composite materials.

22. The method of claim 21, wherein the structure comprises an aircraft wing.

23. The method of claim 22, wherein the mechanical load comprises an aircraft pylon operable to receive a payload.

24. A non-threaded insert operable to couple a mechanical load to an aircraft wing of composite material construction, comprising:
    an upper insert having an axis and a noncircular cross section relative to the axis, wherein the aircraft wing receives the upper insert, wherein the noncircular cross section of the upper insert is received within a complementary noncircular receptacle within the aircraft, and wherein rotation of the upper insert within the receptacle is inhibited by mating the noncircular cross section of the upper insert within the noncircular receptacle;

a lower insert, wherein the aircraft wing receives the upper insert, and wherein the lower insert couples to the upper insert;

a load attachment bolt having two different sets of threads that separately couple to the upper and lower inserts, wherein the coupled upper insert, lower insert and load attachment bolt are operable to receive a mechanical load and distribute the load to the aircraft wing, or apply compressive forces to the aircraft wing.

* * * * *